(12) United States Patent
Iwalewa et al.

(10) Patent No.: US 12,307,406 B2
(45) Date of Patent: May 20, 2025

(54) AI-POWERED WORKFLOW OPTIMIZATION FOR FARM-LEVEL FOOD WASTE

(71) Applicant: Betafeld LLC, Cambridge, MA (US)

(72) Inventors: Tajudeen Iwalewa, Beaverton, OR (US); Alissar Yehya, Lille (FR); Babajide Ayinde, Richmond, TX (US); Asteroide Santana, Florianópolis (BR); Abdul-Akeem Olawoyin, College Station, TX (US); Yongxi Huang, Issaquah, WA (US)

(73) Assignee: Betafeld LLC, Cambridge, MA (US)

( * ) Notice: Subject to any disclaimer, the term of this patent is extended or adjusted under 35 U.S.C. 154(b) by 0 days.

(21) Appl. No.: 18/437,628

(22) Filed: Feb. 9, 2024

(65) Prior Publication Data

US 2024/0185165 A1    Jun. 6, 2024

(51) Int. Cl.
  *G06Q 10/083*  (2024.01)
  *G06F 40/284*  (2020.01)
  *G06F 40/295*  (2020.01)
  *G06Q 10/04*   (2023.01)
  *G06T 7/00*    (2017.01)
  *G06V 20/68*   (2022.01)

(52) U.S. Cl.
  CPC ......... *G06Q 10/083* (2013.01); *G06F 40/284* (2020.01); *G06F 40/295* (2020.01); *G06Q 10/04* (2013.01); *G06T 7/001* (2013.01); *G06V 20/68* (2022.01)

(58) Field of Classification Search
  CPC .... G06Q 10/00–50/00; G06V 10/00–2201/00; G06T 1/00–2215/00
  USPC ................................................ 705/7.11–7.42
  See application file for complete search history.

(56) References Cited

U.S. PATENT DOCUMENTS

| | | | |
|---|---|---|---|
| 11,830,070 B2 * | 11/2023 | Raj | G06Q 40/04 |
| 12,093,865 B1 | 9/2024 | Kovvuri | |
| 2018/0068359 A1 * | 3/2018 | Preston | G06Q 30/0283 |
| 2019/0017982 A1 * | 1/2019 | Lamberti | G01N 21/359 |
| 2021/0170626 A1 * | 6/2021 | Santos Lima | C08L 99/00 |
| 2022/0192212 A1 * | 6/2022 | Burke | F26B 19/005 |
| 2023/0067755 A1 * | 3/2023 | Raj | G06F 18/24 |
| 2023/0305565 A1 * | 9/2023 | Morris | G06Q 10/30 |
| 2023/0417136 A1 * | 12/2023 | Gibson, Jr. | E21B 47/04 |
| 2024/0054191 A1 * | 2/2024 | Weaver | G06N 20/00 |
| 2024/0054503 A1 * | 2/2024 | Weaver | G06Q 30/018 |

OTHER PUBLICATIONS

James Pustejovsky & Amber Stubbs, Natural Language Annotation for Machine Learning, A Guide to Corpus-Building for Applications, 2013, O'Reilly Media, Inc., Sebastopol, California.

* cited by examiner

*Primary Examiner* — Alan S Miller
(74) *Attorney, Agent, or Firm* — Mohr Intellectual Property Law Solutions, PC

(57) ABSTRACT

Systems and methods of the present disclosure relate to workflow optimization for farm level food waste. A method includes employing a material database design for identifying new uses for food waste. The method further includes image processing for verifying aesthetic imperfections of produce, and supply chain optimization for addressing supply chain challenges.

20 Claims, 2 Drawing Sheets

AI-POWERED WORKFLOW OPTIMIZATION FOR FARM-LEVEL FOOD WASTE

BACKGROUND

More than one-third of farm produce is wasted, leading to the squandering of critical resources like agricultural land, labor, water, and energy. Typically, platforms in the farm-level food waste market operate as marketplaces, facilitating the posting, discovery, and purchase of imperfect and surplus produce. However, they lack advanced technology, relying solely on buyers' opinions and preferences for decision-making. Thus, there exists a need for techniques that improve upon and advance logistics for the farm-level food waste market.

SUMMARY

The present disclosure is directed to AI-powered workflow optimization for farm-level food waste. In some examples, a method includes receiving farm produce information from at least one publication. The information is received by a material database development design. Data is extracted from the information with artificial intelligence, and a small subset of the data is manually annotated by a team of agricultural science, materials science and chemistry experts to extract potential use(s) of wasted produce, side stream of the waste produce, chemical compositions of the wasted produce, and industries for the wasted produce. The data is manually annotated by the experts using Label Studio, an open-source data labeling platform to prepare training data. The manually annotated data is used to train artificial intelligence. The A.I. pipeline requires two main natural language processing (N.L.P.) subtasks, including Named Entity Recognition (N.E.R.) and relation extraction. The trained data is then characterized with the artificial intelligence. A material valorization database is outputted. The material valorization database includes valorised data that includes new uses of the wasted produce, the side stream of the wasted produce, chemical compositions of the wasted produce, and industries for the wasted produce. At least 1,500 images per produce type are collected from farms and farmers markets. Each image of farm produce that is captured is visually inspected by an agricultural science expert for aesthetic imperfections of the produce and are manually labeled based on the classes of imperfections that are found on each image. The manually labeled imperfections of produce on each image are used to train artificial intelligence. At least one input is received from a farmer. The input includes an image of farm produce and a description of the farm produce. The image of the produce and the imperfections of the produce provided by the farmer are verified by artificial intelligence, which has been trained to detect produce imperfections. The aesthetic imperfections of the farm produce are outputted when the description closely matches the imperfections of the produce detected by A.I.

An input by the buyer and an input by a logistics provider are received with the supply chain design and provided to a manually created mathematical optimization, which includes a hyper-customized decomposition. The price and weight of the farm produce, and name and location of a farm that includes the farm produce and verified imperfections that have been verified by A.I., are also provided to a manually created mathematical optimization, which includes a hyper-customized decomposition. Logistics for optimization are outputted from the manually created mathematical optimization. The produce information, valorized data and the logistics are optimized. The farm I.D., produce I.D., production date, produce imperfections, optimal quantity and price, produce uses, optimal delivery date, optimal transportation cost, and optimal emissions are outputted.

DETAILED DESCRIPTION

Figure 1:
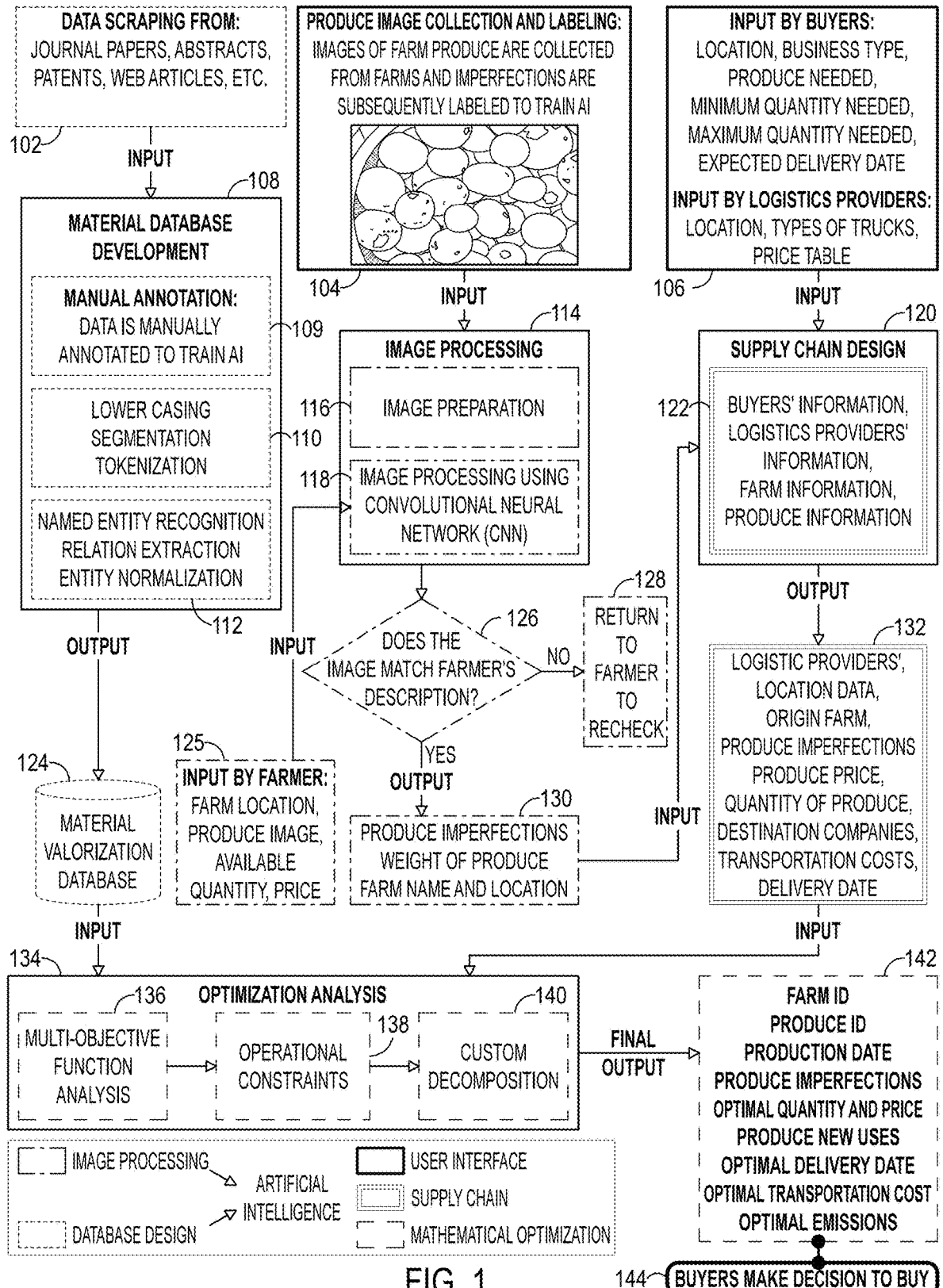
FIG. 1 illustrates AI-powered workflow optimization for farm-level food waste, in accordance with examples of the present disclosure.

The disclosed examples will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various examples are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

The systems and methods, as described herein, include a platform that is based on artificial intelligence, including image processing and deep learning, as well as a powerful prescriptive analytics engine that includes a hyper-customized decomposition mathematical optimization. The platform is a pivotal bridge between farmers and a diverse array of buyers, including food and beverage companies and biorefineries, for example.

The platform may execute operations in three parts: i) the material database development identifies, via artificial intelligence, new uses for food waste (e.g., a material valorization database); ii) the image processing verifies, via the artificial intelligence, the aesthetic imperfections of produce; and iii) the supply chain optimization addresses, via an optimization analysis (e.g., performed by a computer), supply chain challenges.

The platform not only effectively reduces farm-level food waste but also addresses the complex logistics and supply chain challenges faced by farmers and buyers. The platform introduces unique features, including a material valorization database for exploring new uses of food waste, image verification capabilities for posted produce, and an optimization system that tackles farm-level supply chain challenges while quantifying emissions reductions.

Another unique feature of the platform is scalability, allowing potential expansion to handle various materials beyond farm-level food waste, making it a versatile solution for diverse sectors and waste categories. These distinctive capabilities position the platform as an exceptionally innovative and competitive solution in the dynamic farm-level food waste market. By optimizing the process, the platform generates additional revenue for farmers, strengthens the agricultural economy, and ensures a more efficient and sustainable food supply chain. Moreover, redirecting food waste away from landfills via the platform contributes to a circular economy, promoting environmental justice and mitigating greenhouse gas emissions. Also, by reducing food losses, the platform improves food security and fosters equitable food distribution and socio-economic development.

The platform optimizes the reduction of farm-level food waste and addresses the complex challenges faced by farmers and companies. The platform may incorporate three key techniques: an AI-based image processing, text mining to build and continuously update a material valorization database, and a supply chain optimization algorithm. Through the platform's collaborative digital environment, farmers and companies, spanning diverse sectors such as for example, beverage, food, biorefineries, pharmaceuticals, and cosmetics, actively engage after creating accounts. Farmers with imperfect produce destined for waste, photograph and upload their items, specifying the produce type and providing its condition or a description. The AI-based image processing serves a dual purpose: ensuring customer liability protection by verifying the produce against the seller's description and assigning a rating grade based on quality.

The material valorization database, a hidden layer constructed through text mining, identifies novel uses for surplus produce, expanding potential buyers. An optimization engine driven by data from users (e.g., farmers and companies) and the material valorization database, determines the optimal path for produce, thereby matching farmers with companies and maximizing economic, environmental, and social benefits within the supply chain. This user-centric and technology-driven approach ensures a comprehensive and effective solution to address farm-level food waste.

The platform reduces farm-level food waste by efficiently connecting farmers with buyers, transforming imperfect produce into a source of additional revenue for struggling farmers. This reduction in food waste contributes to environmental conservation by diverting organic materials away from landfills, mitigating greenhouse gas emissions, and promoting a circular economy. The platform extends its positive impact to society by addressing issues of environmental justice, lessening food insecurity, and fostering socio-economic development, particularly in underserved communities.

The platform's innovative supply chain optimization algorithm optimizes logistics, minimizing costs related to storage, transportation, and landfilling, creating a win-win situation for both farmers and companies. The continuous updates to the material valorization database play a pivotal role in expanding potential uses for surplus and defected produce, attracting diverse industries, and accelerating innovation in the biobased materials sector. Furthermore, the platform's scalable workflow positions it for future growth and adaptability, ensuring relevance and effectiveness in addressing various waste types and industry-specific needs.

The platform aspires to revolutionize the upcycling treatment of farm-level food waste and establish a circular economy by addressing the significant challenges hindering the creation of a new market for such waste. Leveraging advanced technologies such as A.I., image processing, and mathematical optimization, the platform uniquely stands out in its multifaceted approach.

AI-driven image analysis is employed to validate the accuracy of produce descriptions provided by sellers. This ensures accountability for buyers by ascertaining the variety and condition of the produce and assigns a quality rating based on its overall condition.

In some examples, the material valorization database design may be generated by text mining at least one of published articles, patents, or reports. The material valorization database development design uncovers novel applications for surplus and flawed produce, enhancing their value and diversifying potential uses across industries such as chemicals, pharmaceuticals, biorefineries, and food production, for example. By expanding the range of potential buyers, the platform caters to various industries, from high-quality produce for chemical and pharmaceutical companies to lower-grade produce for composting and biorefineries. This diversification reduces waste destined for landfills and ensures that better-quality produce finds its way to industries with specific standards.

The platform's optimization algorithm is developed through a human-centered process, focusing on need assessment and understanding the challenges faced by farmers and industries. This algorithm addresses logistical, buyer identification, and complex decision-making challenges while minimizing financial costs and environmental impacts through a unique multi-objective function. The platform's workflow is adaptable and scalable, allowing for future expansion to handle different food waste types and industries. The features discussed above emphasize the platform's innovative technology, diverse applications, human-centered optimization, and adaptability for sustained impact.

In some examples, to enhance the versatility and broaden the application of the platform, one modification involves expanding the platform to accommodate different types of organic wastes beyond farm-level food waste, maintaining the use of the existing algorithms and methodology. This expansion entails an augmentation of the image processing component, moving beyond the identification of produce imperfections to categorizing recyclables and discerning specific features based on a material category. Concurrently, the materials valorization database can undergo an extension to incorporate a broader spectrum of food waste data types, providing a more comprehensive resource for potential uses. The optimization algorithm, designed for scalability, may adapt to a wider range, drawing strength from the expanding user and materials valorization databases.

FIG. 1 illustrates AI-powered workflow optimization for farm-level food waste, in accordance with examples of the present disclosure. The workflow may be implemented with the use of computer(s) and A.I. Architecture elements used to integrate components of the platform may include real-time services, frontend (application, web-based), database, and application programming interface (API). Communication between different system components may be enabled using API between the backend (e.g., material valorization database, images of produce, and supply chain data) and various front-end modules, such as authentication and produce search. The back-end services may include user registration functions, data storage for users (e.g., buyer, supplier, logistics provider) and access control measures, to ensure that only authorized users have access to data.

The buyer may be able to search the platform for produce and make requests through an app/website that communicates with the backend over the internet. The supplier can add/delete produce to/from the database through an app/website that communicates with the backend over internet; and the logistics provider can add/delete resources available to the database through an app/website that communicates with the backend over the internet. The platform may employ a user interface (U.I.). The platform may provide features such as a navigation drawer and profile pages for users. Authorization protocols may be utilized so that users can log in with existing account details. A relational database schema may also be used to store user data and specific information about farm produce, new uses of produce, logistics resources, and buyer requests.

With reference to FIG. 1, information 102 may include information from a publication relating to agriculture, such as, for example: a journal article(s), web article(s), and/or abstract(s). Information 104 may include an image of farm produce collected from a farm. Information 104 may also include manually labeled imperfections of produce by an agricultural science expert to train artificial intelligence. Information 125 may be information provided by a farmer (e.g., a description including farm location, produce, available quantity, and/or price). Information 125 also may include an image of the described produce provided by farmer. Information 106 may include information provided/inputted by buyer(s) such as for example: location, business type, produce needed, minimum quantity needed, maximum quantity needed, and/or expected delivery date. Information 106 may also include input/information provided by logistics providers: location, types of trucks, and/or price table.

Information 102 may be data extracted by scraping journal papers, abstracts, patent, web articles, etc. using text mining for a material database development design 108. In the material database development 108, at box 109, mined data is manually annotated by a team of agricultural science, material science, and chemistry experts to extract potential use(s) of wasted produce, produce side stream, chemical compositions of the wasted produce, and industries for the wasted produce. The data is manually annotated by the experts using Label Studio, an open-source data labeling platform to prepare training data. The manually annotated data in the material database development 108, at box 109, is used to train A.I. In some examples, A.I. may characterize annotated data from information 109 in the material database development 108, at box 110 via: at least one of data scraping, lower casing, segmentation, or tokenization. The first step in natural language processing (N.L.P.) pipeline is lower casing, segmentation, or tokenization. Additionally, manually annotated data in the material database development design 108 is used to train A.I., at box 112 via: named entity recognition, relation extraction, and entity normalization.

The two A.I. pipelines, including Named Entity Recognition (N.E.R.) and relation extraction, are two main natural language processing (N.L.P.) subtasks. Both AI subtasks (N.E.R. and relationship extraction) are based on the BERT (Bidirectional Encoder Representations from Transformers). A.I. also may identify novel use(s) for wasted produce, side stream of the wasted produce, chemical compositions of the wasted produce, and industries for the wasted produce in the material database development design 108, thus expanding potential buyers. The novel uses, the side stream of the wasted produce, chemical compositions of the wasted produce, and industries for the wasted produce may be outputted via A.I. from the material database development design 108 in the form of a material valorization database (described below).

Information 104, which includes images of produce whose imperfections are labeled by an agricultural science expert, may be an input for image processing 114 to train artificial intelligence. The images are split into training, validation and test datasets to adequately train the A.I. model and evaluate its generalization to unseen data. Information 125 may be an input for image processing 114 that is performed by A.I. Image processing 114 may include image preparation 116 via A.I. (e.g., OpenCV) and image processing 118 using A.I. (e.g., convolutional neural network (CNNs), recurrent neural network (RNNs), vision transformers (ViTs)). The A.I. architecture employed may be Xception architecture, a deep learning architecture based on separable convolutions and pooling layers. Information 106 may be an input for a supply chain design 120 that includes information 122. In some examples, the supply chain design 120 may be implemented by a computer. Information 122 includes buyer information, logistics providers information, farm information, and/or produce information, for example.

A.I. creates and outputs a material valorization database 124 from the material database development 108. The material valorization database 124 includes new uses of the wasted produce, side stream of the wasted produce, the chemical compositions of the wasted produce, the industries for the wasted produce. The data including the new uses of food waste, may be used to link wasted proddebrisuce with various industries and companies.

Figure 2:
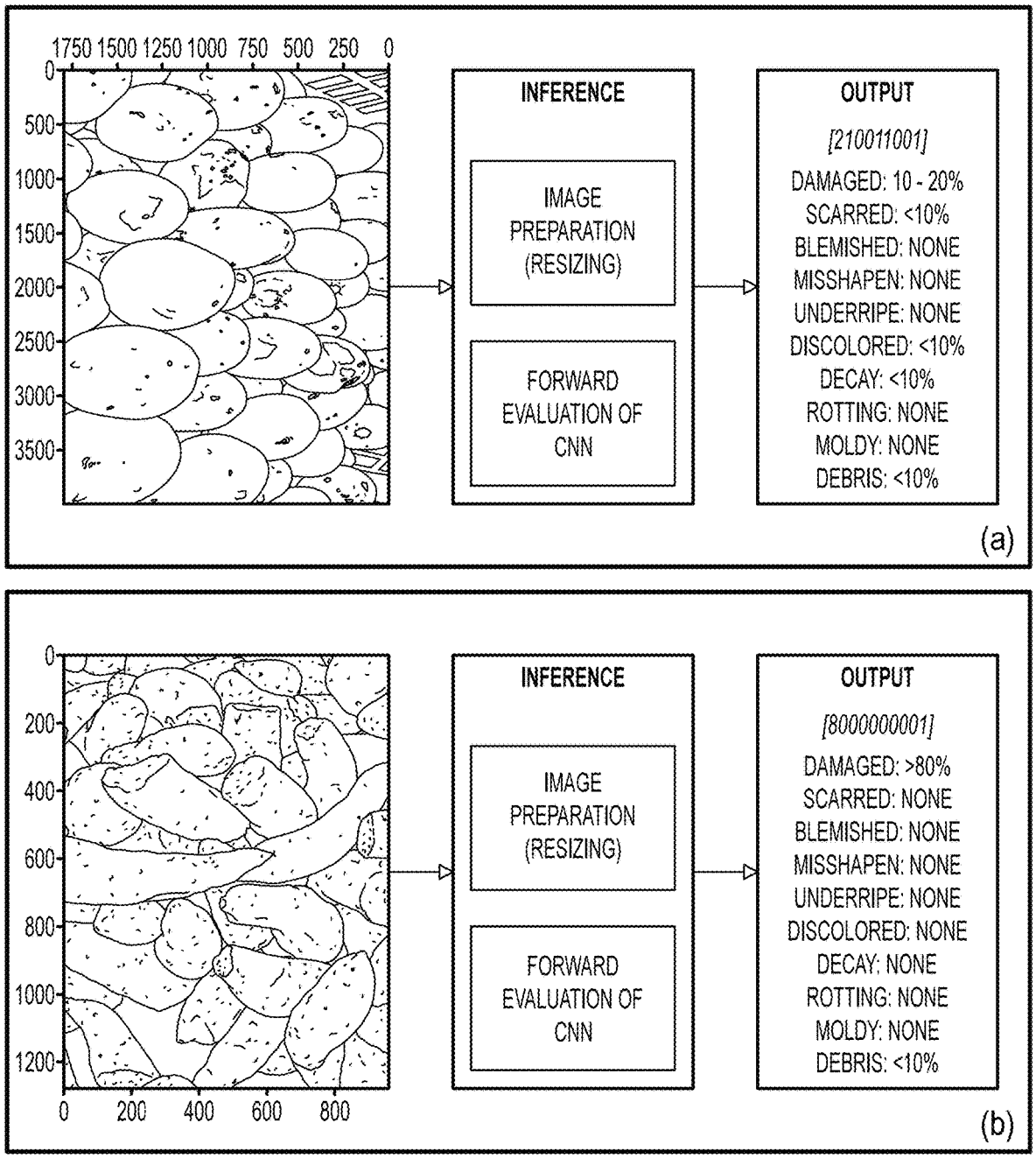
FIG. 2 shows examples of images of produce with imperfections that were used to train the A.I. model, which then grades the produce based on the level of imperfections.

FIG. 2 shows examples of images of produce that were used to train A.I. At least 1,500 images per produce type are collected from farms and farmers markets. Each image contains an arbitrary number of a produce type taken from the top. The images are collected in a variety of capturing conditions, including angles, lighting, and bird's-eye view, and across various classes of imperfections that are specific to every type of produce. These classes of imperfections include damaged, scarred, blemished, misshapen, underripe, discolored, decay, rotting, moldy, and debris.

FIG. 2. Examples of images of produce with imperfections that were used to train the A.I. model, which then grades the produce based on the level of imperfections: (a) an image of imperfect tomatoes; and (b) an image of imperfect potatoes. Each image of farm produce that is captured is visually inspected by an agricultural science expert for aesthetic imperfections of the produce and are manually labeled based on the classes of imperfections that are found on each image. The manually labeled imperfections are graded according to the following scale, ranging from <3% for fresh produce to >80% for severely damaged produce: Grade 1: <3%; Grade 2:3-10%; Grade 3: 10-20%; Grade 4: 20-30%; Grade 5:30-40%; Grade 6:40-50%; Grade 7:50-60%; Grade 8:60-70%; Grade 9:70-80%; and Grade 10: >80%. These grades compare with the USDA Grade Standards for fruits and vegetables as follows (USDA, 2016): Grade 1 corresponds to U.S. No. 1 (fresh, well formed to fairly well formed, and freedom from defects and damage), Grade 2 corresponds to U.S. No. 2 (fresh, fairly well formed, fairly free from decay, and fairly free from damage), and Grades 3 through Grade 10 correspond to imperfect produce (damaged to seriously damaged, scarred, blemished, misshapen, underripe, discolored, decay, rotting, moldy, and debris). The manually labeled imperfections of produce are used to train artificial intelligence. The images are split into training, validation and test datasets to adequately train the A.I. model and evaluate its generalization to unseen data. The A.I. architecture employed may be Xception architecture (Chollet, 2017), a deep learning architecture based on separable convolutions and pooling layers.

A.I. performs a verification 126 of the image of produce posted by the farmer and the description of the imperfections of the produce provided along by the farmer (i.e., image verification for produce posted by the farmer). If the description of the imperfection of the produce provided by the farmer does not match the imperfections of the produce detected by A.I. at box 128, the farmer is notified (e.g., electronic message via a user interface) so that the farmer may adjust/modify his input such that the imperfections of the produce provided by the farmer closely match the imperfections of the produce detected by A.I. This process may continue/repeat until a successful match occurs. Upon a successful match, at box 130, produce imperfections, weight of produce, and farm name and location are outputted via A.I. from image processing 114. Image processing 114 may include pre-training the A.I. with different images of produce with various aesthetic imperfections that are specific to the produce. A.I. processes the image of the produce in the backend, and the output of the image processing is the aesthetic imperfections of the produce. A.I. may also assign a rating grade based on quality of the produce. The produce imperfections, weight of produce, and farm name and location may be received (e.g., via a computer backend) by the supply chain design 120. The supply chain design 120 may output (e.g., via a computer backend) at box 132: logistics providers, location data, origin farm, produce price, quantity of produce, destination companies, transportation costs, and/or delivery date(s).

The material valorization database 124 and the information from box 132 may be received by optimization analysis 134 (e.g., a manually created mathematical optimization in the computer backend receives the inputs and performs the analysis) that addresses farm-level supply chain challenges while quantifying emission reductions. The optimization analysis 134 is composed of manually created multi-objective function analysis 136, manually created operational constraints 138, and manually created custom decomposition 140. Equations (1)-(7) are used for the optimization analysis 134. The optimization problem to be solved is modeled to minimize the following objective function, $\phi$, shown in Equation 1:

$$\phi = \sum_{pijt} sp_{pit} \cdot x_{pijt} + \sum_{pit} sc_{pi} \cdot y_{pit} + \sum_{ijkt} tc_{ijk} \cdot z_{ijkt} + \sum_{ijkt} co_{ijk} \cdot z_{ijkt} \quad (1)$$

[w] Where the first term on the right-hand side is the produce cost, the second term is the storage cost, the third term is the shipping cost, and the fourth term is the CO2-eq emission cost. The decision variables are $x_{pijt}$, which is the amount (lb.) of produce p to be shipped from supplier i to buyer j in period t; $y_{pit}$, which is the amount (lb.) of produce p to be kept in inventory at supplier i from period t to period t+1; and $z_{ijkt}$, which equals 1 if truck k departs from supplier i to buyer j in period t and equals 0 otherwise. The parameter $sp_{pit}$ is the selling price ($/lb.) of produce p from supplier i in period t, $sc_{pi}$ is the storage cost ($/lb.) by supplier i of product p, $tc_{ijk}$ is the transit cost ($) to ship produce from supplier i to buyer j using truck k, and $co_{ijk}$ is the environmental cost indicator ($) for transporting from supplier i to buyer j using truck k.

Equations (2)-(7) are constraints that model operational requirements.

$$ss_{pi} + ap_{pit} = y_{pit} + \sum_j x_{pijt}, \forall p, i, t = 1 \quad (2)$$

-continued $$y_{pit-1} + ap_{pit} = y_{pit} + \sum_j x_{pijt}, \forall p, i, t > 1 \quad (3)$$

$$y_{pit} \leq su_{pi}, \forall p, i, t \quad (4)$$

$$\sum_p x_{pijt} \leq \sum_k tu_k \cdot z_{ijkt}, \forall i, j, t \quad (5)$$

$$\sum_i x_{pij,t-tt_{ij}} = d_{pjt}, \forall p, j, t \quad (6)$$

$$\sum_{i,j,t} z_{ijkt} \leq 1, \forall k \quad (7)$$

[w] Where Eq. (2) and Eq. (3) are the flow balance of produce p at supplier i in period t, Eq. (4) is the storage capacity of produce p at supplier i in period t, Eq. (5) is the truck capacity constraint, Eq. (6) ensures that the total amount of produce shipped must meet demand $d_{pjt}$, and Eq. (7) is a constraint to avoid using the same truck for multiple shipments at period t. The parameter $ss_{pi}$ is the initial stock (lb.) of produce p at supplier i, $ap_{pit}$ is the available amount (lb.) of produce p at supplier i in period t, $su_{pi}$ is the storage capacity (lb.) of produce p by supplier i at any period, tux is the capacity of truck k, $d_{pjt}$ is the demand (lb.) of produce p by buyer j in period t, $tt_{ij}$ is the number of time periods to transport a produce from supplier i to buyer j. inventory aging, route consolidation, landfill environmental cost indicator and transportation, and mixed shipments may be added to the formulation, which, due to the complexities involved, is solved using custom decomposition. Also, optimization analysis at 134, through custom decomposition, incorporates real-time data on produce lifespan and deterioration rate, storage conditions, and transit times to predict produce quality at the time of delivery to a buyer. The final output from the optimization analysis 134 is shown in box 142 which includes farm I.D., produce I.D., production date, produce imperfections, optimal quantity and price, produce uses, optimal delivery date, optimal transportation cost, and optimal emissions. A buyer makes a decision to buy the produce at box 144.

In the preferred embodiment and best moder for practice the invention, the information about produce is scraped from journal articles, patents, web articles, abstracts, etc. The mined information serves as inputs for the material database development. The information is annotated by a team of experts using interdisciplinary scientific expertise, including agricultural scientists, material scientists and chemists, on Label Studio (an open-source data labelling platform to prepare training data). The annotated data includes potential uses of wasted produce, side stream of wasted produce, chemical compositions of wasted produce, industries for the wasted produce.

Artificial intelligence (using the first step in natural language processing (N.L.P.) pipeline, including lower casing, segmentation, or tokenization) automatically characterizes the manually annotated data. Additionally, the manually annotated data is used to train artificial intelligence, including named entity recognition and relation extraction, which are two main N.L.P. subtasks. Once trained, the A.I. system is automated to process raw information without human intervention. A.I. is then used to automatically characterize all the extracted information outputting a continuously updated material valorization database. The material valorization database is a large database which contains potential uses of wasted produce, side stream of wasted produce, chemical compositions of wasted produce, and industries for the wasted produce. This data is used to link every produce with various industries and the database is automatically and continuously updated using A.I. as more information is mined.

At least 1,500 images per produce type are collected from farms and farmers markets to obtain a robust data set to train artificial intelligence. Each image of farm produce that is captured is visually inspected by an agricultural science expert for aesthetic imperfections of the produce and the imperfections are manually labeled and assigned grades based on the classes of imperfections that are found on each image. The manually labeled imperfections of produce on each image are used to train artificial intelligence. Artificial intelligence (open-source computer vision library such as OpenCV) is first used to prepare the images. The open-source computer vision library provides the input layer for convolutional neural network, which processes the images in the backend of the technology platform.

In In the frontend (i.e., user interface) of the technology platform, a farmer inputs an image of farm produce and a description of the farm produce. The image of the produce and the imperfections of the produce provided by the farmer are automatically processed and verified by artificial intelligence (e.g., convolutional neural network) in the backend, which has been trained to detect produce imperfections. The aesthetic imperfections of the produce are automatically analyzed, and the system verifies whether the description provided by the farmer closely matches the imperfections of the produce detected by A.I. The output is the verified aesthetic imperfections of the farm produce. The defect classification and verification process is fully automated, enabling produce quality assessment without human intervention. Importantly, the AI model is continuously updated and retrained using new image data and classification outcomes to account for evolving produce characteristics. This allows the system to iteratively adapt its detection and classification process in response to changing agricultural conditions, such as seasonal variations, different crop types, or shifting environmental factors. As a result, the system remains robust and accurate, ensuring consistent performance across diverse and dynamic real-world farming scenarios.

The verified imperfections of farm produce, together with the price and weight of the produce, and the name and location of the farm, are among the data for the supply chain design; other data are information provided by buyers (food, beverage, and animal feed companies, etc.) and logistics providers.

The supply chain design data and material valorisation database will serve as inputs for the manually created mathematical optimization. The optimization uses manually created hyper-customized mathematical modelling combined with optimization packages and customized heuristics. This approach enables the handling of large-scale instances involving millions of decision variables and constraints. By considering additional aspects such as material-buyer matching, supply and storage availability, and transportation logistics, the optimization engine will recommend optimal material-buyer matchings. The goal of the optimization is to reduce operational costs, increase overall efficiency, and decrease the environmental impact, specifically carbon emissions, thus enabling a sustainable and environmentally efficient supply chain.

The mathematical optimization (134) then outputs an optimized supply chain that provides the best price, quantity, delivery date, uses, and lowest transportation cost. Also, as the AI-based image-processing algorithm assesses and grades the initial quality of the produce, the optimization model incorporates real-time data on produce lifespan and deterioration rate, storage conditions, and transit times to predict produce quality at the time of delivery to customers. Additionally, the optimization will list new, non-traditional uses for the produce. A buyer makes a decision to buy the produce at box 144.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A method for reducing wastage of food from farms, comprising:
   (a) applying an AI-driven text mining framework to extract and structure unstructured agricultural data from at least one publication, wherein the AI model identifies and categorizes farm produce characteristics to generate structured datasets for further processing;
   (b) manually annotating the extracted agricultural data through a domain-specific process to identify uses of imperfect or surplus produce, side streams of the farm produce, chemical compositions of the farm produce, and industries for the farm produce;
   (c) training an artificial intelligence model with the manually annotated agricultural data to generate predictions on potential uses of imperfect or surplus farm produce for specific industries, side streams of the farm produce, and chemical compositions of the farm produce;
   (d) automating the generation and continuous updating of a material valorization database based on the AI-generated predictions from the trained artificial intelligence model, wherein the database is integrated into the backend of a technology platform and dynamically structures and categorizes farm produce according to identified uses, side streams, chemical compositions, and industry applications to facilitate computational analysis for logistical optimization;
   (e) processing farm produce images using an AI-driven computer vision model, wherein the images are labeled based on agricultural domain-specific categories of imperfections, and wherein an artificial intelligence model, trained with the labeled images, applies an image processing architecture, such as a convolutional neural network (CNN), to detect produce imperfections and classify the produce based on defect severity, wherein the artificial intelligence model is continuously refined using newly acquired image data to enable real-time adaptation to changing agricultural conditions;

(f) verifying the detected produce imperfections using the trained artificial intelligence model, wherein the verification process compares uploaded farm produce images against their corresponding descriptions, and wherein an iterative computational process enables refinement of the descriptions until they align with the AI-classified defect severity;

(g) applying a multi-objective optimization model integrated into the backend of the technology platform, wherein the model integrates AI-classified produce defects, material valorization data, and logistics data, and applies custom decomposition techniques to account for logistics constraints including storage capacity, truck capacity, transportation availability, and perishability; and (h) executing a computational process within the backend of the technology platform to generate actionable logistical recommendations, wherein the recommendations are provided through the frontend of the platform and facilitate the matching of imperfect or surplus produce with buyers to reduce food wastage from farms.

2. The method of claim 1, wherein the at least one publication extracted in step (a) comprises at least one of a journal article, research abstract, patent document, or web-based article.

3. The method of claim 1, wherein the annotation in step (b) is performed manually by a team comprising experts in agricultural science, materials science, and chemistry.

4. The method of claim 1, wherein the artificial intelligence in step (c) is trained using deep learning techniques, including named entity recognition (NER) and relation extraction (RE).

5. The method of claim 1, wherein the images of produce in step (e) are sourced from one of farms or farmers' markets, and wherein the labeling of produce imperfections is performed manually by an agricultural science expert.

6. The method of claim 1, wherein the AI image processing models described in step (e) assign a quantitative quality rating based on the severity of the defects detected on the produce.

7. The method of claim 1, wherein the material valorization database in step (d) is updated by adding newly extracted agricultural data, wherein the updates expand the database with additional identified chemical compositions, side streams, and potential alternative applications of farm produce based on AI-processed annotations.

8. The method of claim 1, wherein the multi-objective optimization in step (g) occurs by reducing operational costs, increasing operational efficiency, and reducing environmental impacts.

9. The method of claim 1, wherein the computational process in step (h) incorporates real-time updates on produce lifespan, deterioration rate, and environmental conditions to refine the inputs used in generating logistical recommendations.

10. The method of claim 1, wherein the generated actionable logistical recommendations in step (h) comprise at least one of the following: farm details, produce details, produce imperfections, uses of produce, optimal quantity, optimal produce price, optimal delivery date, optimal transportation costs, and optimal emissions.

11. A method to preventing farm-level food waste from being sent to landfills by diverting said farm-level food waste from landfills to specific industries or applications, comprising:

(a) applying an AI-driven text mining framework to extract and structure unstructured agricultural data from at least one publication, wherein the AI model identifies and categorizes farm produce characteristics to generate structured datasets for further processing;

(b) manually annotating the extracted agricultural data through a domain-specific process to identify uses of imperfect or surplus produce, side streams of the farm produce, chemical compositions of the farm produce, and industries for the farm produce;

(c) training an artificial intelligence model with the manually annotated agricultural data to generate predictions on potential uses of imperfect or surplus farm produce for specific industries, side streams of the farm produce, and chemical compositions of the farm produce;

(d) automating the generation and continuous updating of a material valorization database based on the AI-generated predictions from the trained artificial intelligence model, wherein the database is integrated into the backend of a technology platform and dynamically structures and categorizes farm produce according to identified uses, side streams, chemical compositions, and industry applications to facilitate computational analysis for logistical optimization;

(e) processing farm produce images using an AI-driven computer vision model, wherein the images are labeled based on agricultural domain-specific categories of imperfections, and wherein an artificial intelligence model, trained with the labeled images, applies an image processing architecture, such as a convolutional neural network (CNN), to detect produce imperfections and classify the produce based on defect severity, wherein the artificial intelligence model is continuously refined using newly acquired image data to enable real-time adaptation to changing agricultural conditions;

(f) verifying the detected produce imperfections using the trained artificial intelligence model, wherein the verification process compares uploaded farm produce images against their corresponding descriptions, and wherein an iterative computational process enables refinement of the descriptions until they align with the AI-classified defect severity;

(g) applying a multi-objective optimization model integrated into the backend of the technology platform, wherein the model integrates AI-classified produce defects, material valorization data, and logistics data, and applies custom decomposition techniques to account for logistics constraints including storage capacity, truck capacity, transportation availability, and perishability; and (h) executing a computational process within the backend of the technology platform to generate actionable logistical recommendations, wherein the recommendations are provided through the frontend of the platform and facilitate the matching of imperfect or surplus produce with buyers to enable diversion from landfills.

12. The method of claim 11, wherein the artificial intelligence in step (c) is trained using deep learning techniques, including named entity recognition (NER) and relation extraction (RE).

13. The method of claim 11, wherein the AI image processing models described in step (e) assign a quantitative quality rating based on the severity of the defects detected on the produce.

14. The method of claim 11, wherein the computational process in step (h) incorporates real-time updates on produce lifespan, deterioration rate, and environmental conditions to refine the inputs used in generating logistical recommendations.

15. The method of claim 1, wherein the generated actionable logistical recommendations in step (h) comprise at least one of the following: farm details, produce details, produce imperfections, uses of produce, optimal quantity, optimal produce price, optimal delivery date, optimal transportation costs, and optimal emissions.

16. A method for minimizing greenhouse gas emissions, reducing resource waste, and mitigating other environmental impacts associated with farm-level food waste, comprising:
   (a) applying an AI-driven text mining framework to extract and structure unstructured agricultural data from at least one publication, wherein the AI model identifies and categorizes farm produce characteristics to generate structured datasets for further processing;
   (b) manually annotating the extracted agricultural data through a domain-specific process to identify uses of imperfect or surplus produce, side streams of the farm produce, chemical compositions of the farm produce, and industries for the farm produce;
   (c) training an artificial intelligence model with the manually annotated agricultural data to generate predictions on potential uses of imperfect or surplus farm produce for specific industries, side streams of the farm produce, and chemical compositions of the farm produce;
   (d) automating the generation and continuous updating of a material valorization database based on the AI-generated predictions from the trained artificial intelligence model, wherein the database is integrated into the backend of a technology platform and dynamically structures and categorizes farm produce according to identified uses, side streams, chemical compositions, and industry applications to facilitate computational analysis for logistical optimization;
   (e) processing farm produce images using an AI-driven computer vision model, wherein the images are labeled based on agricultural domain-specific categories of imperfections, and wherein an artificial intelligence model, trained with the labeled images, applies an image processing architecture, such as a convolutional neural network (CNN), to detect produce imperfections and classify the produce based on defect severity, wherein the artificial intelligence model is continuously refined using newly acquired image data to enable real-time adaptation to changing agricultural conditions;
   (f) verifying the detected produce imperfections using the trained artificial intelligence model, wherein the verification process compares uploaded farm produce images against their corresponding descriptions, and wherein an iterative computational process enables refinement of the descriptions until they align with the AI-classified defect severity;
   (g) applying a multi-objective optimization model integrated into the backend of the technology platform, wherein the model integrates AI-classified produce defects, material valorization data, and logistics data, and applies custom decomposition techniques to account for logistics constraints including storage capacity, truck capacity, transportation availability, and perishability; and
   (h) executing a computational process within the backend of the technology platform to generate actionable logistical recommendations, wherein the recommendations are provided through the frontend of the platform and facilitate the matching of imperfect or surplus produce with buyers to reduce resource waste, minimize greenhouse gas emissions, and mitigate other environmental impacts.

17. The method of claim 16, wherein the artificial intelligence in step (c) is trained using deep learning techniques, including named entity recognition (NER) and relation extraction (RE).

18. The method of claim 16, wherein the AI image processing models described in step (e) assign a quantitative quality rating based on the severity of the defects detected on the produce.

19. The method of claim 16, wherein the computational process in step (h) incorporates real-time updates on produce lifespan, deterioration rate, and environmental conditions to refine the inputs used in generating logistical recommendations.

20. The method of claim 16, wherein the generated actionable logistical recommendations in step (h) comprise at least one of the following: farm details, produce details, produce imperfections, uses of produce, optimal quantity, optimal produce price, optimal delivery date, optimal transportation costs, and optimal emissions.

* * * * *